(12) United States Patent
Matsui et al.

(10) Patent No.: US 12,176,516 B2
(45) Date of Patent: Dec. 24, 2024

(54) SECONDARY BATTERY

(71) Applicant: MURATA MANUFACTURING CO., LTD., Kyoto (JP)

(72) Inventors: Takaaki Matsui, Kyoto (JP); Futoshi Sato, Kyoto (JP); Keitaro Kitada, Kyoto (JP); Taichi Katsumoto, Kyoto (JP); Takuma Kawahara, Kyoto (JP); Yuta Hirano, Kyoto (JP); Taichi Kogure, Kyoto (JP); Kazuki Honda, Kyoto (JP); Shinji Hatake, Kyoto (JP); Takashi Sato, Kyoto (JP); Naoko Yamakawa, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 770 days.

(21) Appl. No.: 17/333,664

(22) Filed: May 28, 2021

(65) Prior Publication Data
US 2021/0288308 A1 Sep. 16, 2021

Related U.S. Application Data

(63) Continuation of application No. PCT/JP2019/044337, filed on Nov. 12, 2019.

(30) Foreign Application Priority Data

Nov. 30, 2018 (JP) ................ 2018-225945

(51) Int. Cl.
*H01M 4/131* (2010.01)
*H01M 4/133* (2010.01)
(Continued)

(52) U.S. Cl.
CPC .......... *H01M 4/131* (2013.01); *H01M 4/133* (2013.01); *H01M 4/525* (2013.01); *H01M 4/587* (2013.01);
(Continued)

(58) Field of Classification Search
CPC .... H01M 4/131; H01M 4/1315; H01M 4/133; H01M 4/587; H01M 4/525; H01M 10/0525; H01M 10/0565; H01M 10/0566
See application file for complete search history.

(56) References Cited

U.S. PATENT DOCUMENTS

2006/0222957 A1   10/2006  Hara et al.
2007/0082261 A1*  4/2007  Lee ............... H01M 50/449
                                          429/251

(Continued)

FOREIGN PATENT DOCUMENTS

JP      2001217011 A    8/2001
JP      2002252028 A    9/2002
(Continued)

OTHER PUBLICATIONS

International Search Report for Application No. PCT/JP2019/044337, dated Feb. 18, 2020.

*Primary Examiner* — Christopher P Domone
(74) *Attorney, Agent, or Firm* — K&L Gates LLP

(57) ABSTRACT

A secondary battery includes a positive electrode, a negative electrode, and an electrolytic solution. The positive electrode includes a positive electrode active material layer including a lithium-cobalt composite oxide. The lithium-cobalt composite oxide has a layered rock-salt crystal structure. The negative electrode includes a negative electrode active material layer including graphite. When the secondary battery is charged and discharged with an upper limit of a closed circuit voltage being set to 4.42 V or higher, a unit capacity (mAh/g) satisfies a condition represented by 168 mAh/g≤unit capacity (mAh/g)≤(−0.28×area rate (%)+178) mAh/g.

10 Claims, 4 Drawing Sheets

(51) Int. Cl.
*H01M 4/525* (2010.01)
*H01M 4/587* (2010.01)
*H01M 10/0525* (2010.01)
*H01M 10/0565* (2010.01)
*H01M 10/0566* (2010.01)

(52) U.S. Cl.
CPC ... *H01M 10/0525* (2013.01); *H01M 10/0565* (2013.01); *H01M 10/0566* (2013.01)

(56) References Cited

U.S. PATENT DOCUMENTS

| | | | | |
|---|---|---|---|---|
| 2009/0181305 | A1* | 7/2009 | Nagayama | H01M 50/443 429/223 |
| 2014/0023935 | A1* | 1/2014 | Noguchi | H01M 4/587 429/329 |
| 2017/0207444 | A1* | 7/2017 | Yanagihara | H01M 50/251 |

FOREIGN PATENT DOCUMENTS

| | | | |
|---|---|---|---|
| JP | 2006313719 | A | 11/2006 |
| JP | 2007048560 | A | 2/2007 |
| JP | 2012124026 | A | 6/2012 |
| JP | 2017191662 | A | 10/2017 |

\* cited by examiner

SECONDARY BATTERY

CROSS REFERENCE TO RELATED APPLICATIONS

The present application is a continuation of PCT patent application no. PCT/JP2019/044337, filed on Nov. 12, 2019, which claims priority to Japanese patent application no. JP2018-225945 filed on Nov. 30, 2018, the entire contents of which are being incorporated herein by reference.

BACKGROUND

The present technology generally relates to a secondary battery including: a positive electrode that includes a lithium-cobalt composite oxide; and a negative electrode that includes graphite.

Various electronic apparatuses such as mobile phones have been widely used. Accordingly, a secondary battery is under development as a power source which is smaller in size and lighter in weight and allows for a higher energy density. The secondary battery includes a positive electrode, a negative electrode, and an electrolytic solution.

Various considerations have been given to a configuration of the secondary battery to improve battery characteristics. Specifically, to achieve a longer life, a rated capacity is set to a predetermined capacity in terms of a capacity per unit weight of a positive electrode active material. In addition, to suppress swelling upon charging and discharging, a ratio of a capacity per unit area of a positive electrode to a capacity per unit area of a negative electrode is set to a predetermined ratio.

SUMMARY

The present technology generally relates to a secondary battery including a positive electrode that includes a lithium-cobalt composite oxide; and a negative electrode that includes graphite.

Electronic apparatuses, on which a secondary battery is to be mounted, are increasingly gaining higher performance and more functions, causing more frequent use of the electronic apparatuses and expanding a use environment of the electronic apparatuses. Accordingly, there is still room for improvement in terms of battery characteristics of the secondary battery.

The present technology has been made in view of such an issue and it is an object of the technology to provide a secondary battery that makes it possible to achieve a superior battery characteristic.

A secondary battery according to an embodiment of the technology includes a positive electrode, a negative electrode, and an electrolytic solution. The positive electrode includes a positive electrode active material layer including a lithium-cobalt composite oxide. The lithium-cobalt composite oxide is represented by Formula (1) below and has a layered rock-salt crystal structure. The negative electrode includes a negative electrode active material layer including graphite. When the secondary battery is charged and discharged with an upper limit of a closed circuit voltage being set to 4.42 V or higher, a unit capacity (mAh/g) represented by Formula (2) below satisfies a condition represented by Formula (4) below in association with an area rate (%) represented by Formula (3) below.

$$Li_xCo_{1-y}M_yO_{2-z}X_z \quad (1)$$

where:
M includes at least one of titanium (Ti), vanadium (V), chromium (Cr), manganese (Mn), iron (Fe), nickel (Ni), copper (Cu), sodium (Na), magnesium (Mg), aluminum (Al), silicon (Si), tin (Sn), potassium (K), calcium (Ca), zinc (Zn), gallium (Ga), strontium (Sr), yttrium (Y), zirconium (Zr), niobium (Nb), molybdenum (Mo), barium (Ba), lanthanum (La), tungsten (W), or boron (B);
X includes at least one of fluorine (F), chlorine (Cl), bromine (Br), iodine (I), or sulfur (S); and
x, y, and z satisfy $0.8 < x < 1.2$, $0 \leq y < 0.15$, and $0 \leq z < 0.05$.

$$\text{Unit capacity (mAh/g)} = \text{rated capacity (mAh)/weight (g) of positive electrode active material layer} \quad (2)$$

where the rated capacity is a capacity measured by the secondary battery being charged with a constant current until a closed circuit voltage reaches 4.42 V or higher, and the secondary battery being charged with a constant voltage of the closed circuit voltage of 4.42 V or higher, following which the secondary battery being discharged with a constant current.

$$\text{Area rate (\%)} = [1 - (\text{area (cm}^2) \text{ of positive electrode active material layer/area (cm}^2) \text{ of negative electrode active material layer})] \times 100 \quad (3).$$

$$168 \text{ mAh/g} \leq \text{unit capacity (mAh/g)} \leq (-0.28 \times \text{area rate (\%)} + 178) \text{ mAh/g} \quad (4).$$

It should be understood that that respective definitions and respective measuring methods of the series of parameters (the unit capacity, the rated capacity, the weight of the positive electrode active material layer, the area rate, the area of the positive electrode active material layer, and the area of the negative electrode active material layer), etc. included in Formulae (2) to (4) will be described later.

According to the secondary battery of the present technology, the positive electrode includes the lithium-cobalt composite oxide, the negative electrode includes graphite, and the unit capacity satisfies, in the relationship with the area rate, the above-described condition. Accordingly, it is possible to achieve a superior battery characteristic.

It should be understood that that effects of the technology are not necessarily limited to those described above and may include any of a series of effects described below in relation to the technology.

DETAILED DESCRIPTION

As described herein, the present disclosure will be described based on examples with reference to the drawings, but the present disclosure is not to be considered limited to the examples, and various numerical values and materials in the examples are considered by way of example.

A description is given first of a secondary battery according to one embodiment of the technology.

The secondary battery described below is a lithium-ion secondary battery that obtains a battery capacity on the basis of a lithium insertion phenomenon and a lithium extraction phenomenon, as will be described later. The secondary battery includes a positive electrode 13 and a negative electrode 14 (see FIG. 2).

To prevent precipitation of lithium metal on a surface of the negative electrode 14 during charging, an electrochemical capacity per unit area of the negative electrode 14 is greater than an electrochemical capacity per unit area of the positive electrode 13 in the secondary battery.

It should be understood that that, however, mass of a positive electrode active material included in the positive electrode 13 is sufficiently greater than mass of a negative electrode active material included in the negative electrode 14 to allow a predetermined condition related to a unit capacity C (mAh/g), which will be described later, to be satisfied.

Figure 1:
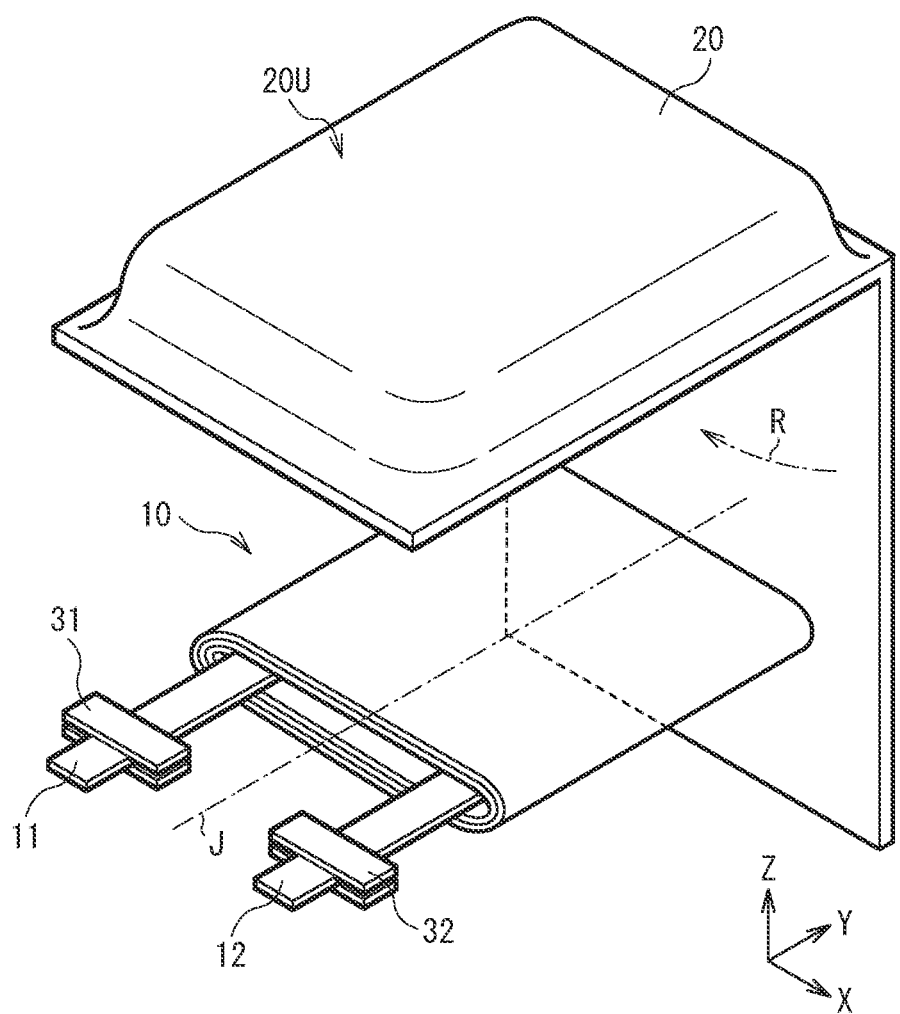
FIG. 1 is a perspective view of a configuration of a secondary battery according to an embodiment of the present technology.
Figure 2:
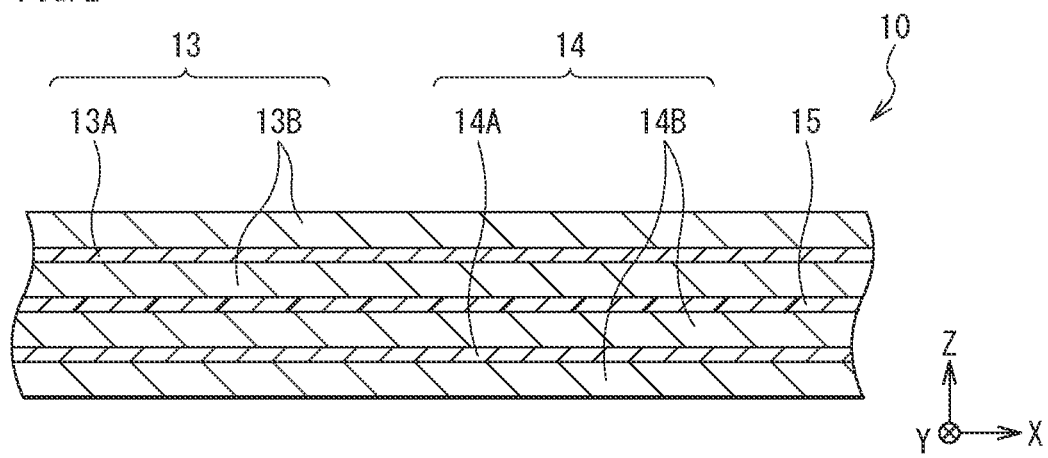
FIG. 2 is a sectional view of a configuration of a wound electrode body illustrated in FIG. 1.
Figure 3:
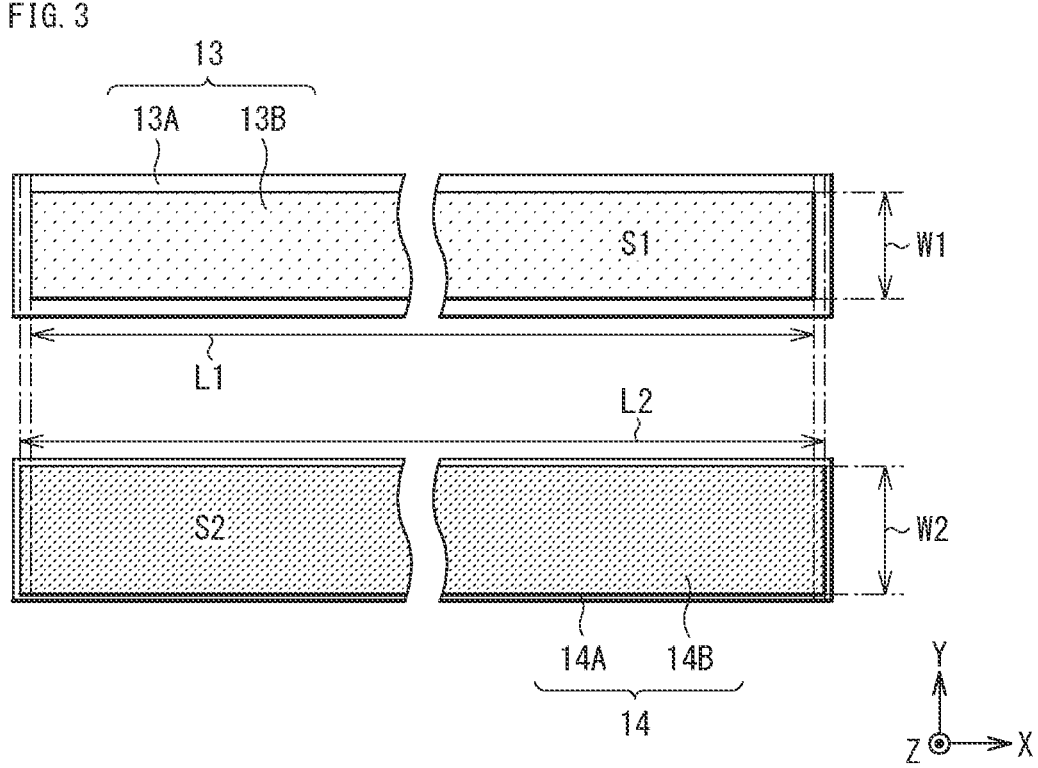
FIG. 3 is a schematic plan view of respective configurations of a positive electrode and a negative electrode.

FIG. 1 is a perspective view of a configuration of the secondary battery. FIG. 2 is a sectional view of a configuration of a wound electrode body 10 illustrated in FIG. 1. FIG. 3 is a schematic plan view of respective configurations of the positive electrode 13 and the negative electrode 14 illustrated in FIG. 1. It should be understood that that FIG. 1 illustrates a state in which the wound electrode body 10 and an outer package member 20 are separated away from each other, and FIG. 2 is an enlarged view of only a portion of the wound electrode body 10.

Referring to FIG. 1, the secondary battery includes, for example, the outer package member 20 having a film shape, and the wound electrode body 10 housed in the outer package member 20. The outer package member 20 has flexibility or softness. The wound electrode body 10 serves as a battery device. A positive electrode lead 11 and a negative electrode lead 12 are coupled to the wound electrode body 10. In other words, the secondary battery described here is a so-called laminated secondary battery.

Referring to FIG. 1, the outer package member 20 is, for example, a single film that is foldable in a direction of an arrow R. The outer package member 20 has a depression 20U, for example. The depression 20U is adapted to receive the wound electrode body 10. Thus, the outer package member 20 houses the wound electrode body 10, thereby housing, for example, the positive electrode 13, the negative electrode 14, and an electrolytic solution to be described later.

The outer package member 20 may be, for example: a film (a polymer film) including a polymer compound; a thin metal plate (a metal foil); or a stacked body (a laminated film) in which the polymer film and the metal foil are stacked on each other. The polymer film may have a single layer or multiple layers. In a similar manner, the metal foil may have a single layer or multiple layers. The laminated film may have, for example, polymer films and metal foils that are alternately stacked. The number of stacked layers of the polymer films and the number of stacked layers of the metal foils may each be set to any value.

In particular, the outer package member 20 is preferably a laminated film. A reason for this is that a sufficient sealing property is obtainable, and sufficient durability is also obtainable. Specifically, the outer package member 20 is a laminated film including, for example, a fusion-bonding layer, a metal layer, and a surface protective layer that are stacked in this order from an inner side to an outer side. In a process of manufacturing the secondary battery, for example, the outer package member 20 is folded in such a manner that portions of the fusion-bonding layer oppose each other with the wound electrode body 10 interposed therebetween. Thereafter, outer edges of the fusion-bonding layer are fusion-bonded to each other, thereby sealing the outer package member 20. The fusion-bonding layer is, for example, a polymer film including polypropylene. The metal layer is, for example, a metal foil including aluminum. The surface protective layer is, for example, a polymer film including nylon.

The outer package member 20 may include, for example, two laminated films that are adhered to each other by means of a material such as an adhesive.

A sealing film 31, for example, is disposed between the outer package member 20 and the positive electrode lead 11. The sealing film 31 is adapted to prevent entry of outside air into the outer package member 20. The sealing film 31 includes, for example, a polyolefin resin such as polypropylene.

A sealing film 32, for example, is disposed between the outer package member 20 and the negative electrode lead 12. The sealing film 32 has a role similar to that of the sealing film 31 described above. A material included in the sealing film 32 is, for example, similar to the material included in the sealing film 31.

As illustrated in FIGS. 1 to 3, the wound electrode body 10 includes the positive electrode 13, the negative electrode 14, and a separator 15, for example. In the wound electrode body 10, the positive electrode 13 and the negative electrode 14 are stacked with the separator 15 interposed therebetween, and the stack of the positive electrode 13, the negative electrode 14, and the separator 15 is wound, for example. The wound electrode body 10 is impregnated with an electrolytic solution, for example. The electrolytic solution is a liquid electrolyte. The positive electrode 13, the negative electrode 14, and the separator 15 are each impregnated with the electrolytic solution accordingly, for example. A surface of the wound electrode body 10 may be protected by means of an unillustrated protective tape.

In a process of manufacturing the secondary battery, which will be described later, a jig having an elongated shape is used to wind the positive electrode 13, the negative electrode 14, and the separator 15 about a winding axis J, for example. The winding axis J is an axis extending in a Y-axis direction. Accordingly, the wound electrode body 10 is formed into an elongated shape resulting from the shape of the jig, as illustrated in FIG. 1, for example.

As illustrated in FIGS. 2 and 3, the positive electrode 13 includes, for example, a positive electrode current collector 13A, and a positive electrode active material layer 13B provided on the positive electrode current collector 13A. The positive electrode active material layer 13B may be provided, for example, only on one side of the positive electrode current collector 13A, or on each of both sides of the positive electrode current collector 13A. FIG. 2 illustrates a case where the positive electrode active material layer 13B is provided on each of both sides of the positive electrode current collector 13A, for example.

The positive electrode current collector 13A includes, for example, an electrically conductive material such as aluminum. The positive electrode active material layer 13B includes, as a positive electrode active material or positive electrode active materials, one or more of positive electrode materials into which lithium ions are insertable and from which lithium ions are extractable. The positive electrode active material layer 13B may further include another material, examples of which include a positive electrode binder and a positive electrode conductor.

As illustrated in FIG. 3, for example, the positive electrode active material layer 13B is not provided on an entire surface of the positive electrode current collector 13A, but is provided on a part of the surface. Here, the positive electrode active material layer 13B is provided, for example, in a region inside outer edges of the positive electrode current collector 13A, and has an area S1 defined by a width W1 (a dimension in the Y-axis direction) and a length L1 (a dimension in an X-axis direction). As a result, a margin (a region where no positive electrode active material layer 13B is provided) is given between: the outer edges of the positive electrode current collector 13A; and the positive electrode active material layer 13B. The positive electrode 13 is wound in a direction (the X-axis direction) along the length L1. In a case where the positive electrode active material layer 13B is provided on each of both sides of the positive electrode current collector 13A, the configuration of the positive electrode active material layer 13B described herein is applied, for example, to one positive electrode active material layer 13B provided on one side of the positive electrode current collector 13A, and to the other positive electrode active material layer 13B provided on the other side of the positive electrode current collector 13A. In FIG. 3, the positive electrode active material layer 13B is shaded lightly.

The positive electrode material includes a lithium compound. The term "lithium compound" is a generic term for a compound that includes lithium as a constituent element. A reason why the positive electrode material includes the lithium compound is that a high energy density is achievable. The lithium compound includes a lithium-cobalt composite oxide having a layered rock-salt crystal structure. Hereinafter, the lithium-cobalt composite oxide having the layered rock-salt crystal structure is referred to as a "layered rock-salt lithium-cobalt composite oxide". A reason why the lithium compound includes the layered rock-salt lithium-cobalt composite oxide is that a high energy density is stably achievable. The term "layered rock-salt lithium-cobalt composite oxide" is a generic term for a composite oxide that includes lithium and cobalt as constituent elements. Accordingly, the layered rock-salt lithium-cobalt composite oxide may further include one or more of other elements (elements other than lithium and cobalt). The other elements are not limited to particular kinds; however, the other elements may be those belong to groups 2 to 15 in the long periodic table of elements, for example.

Specifically, the layered rock-salt lithium-cobalt composite oxide includes one or more of compounds represented by Formula (1) below. A reason for this is that a sufficient energy density is stably achievable. It should be understood that that a composition of lithium differs depending on a charging state and a discharging state. A value of x included in Formula (1) represents a value in a state in which the positive electrode 13 taken out from the secondary battery has been discharged until the potential has reached 3 V (versus a lithium reference electrode).

$$Li_xCo_{1-y}M_yO_{2-z}X_z \qquad (1)$$

where:
M is at least one of titanium (Ti), vanadium (V), chromium (Cr), manganese (Mn), iron (Fe), nickel (Ni), copper (Cu), sodium (Na), magnesium (Mg), aluminum (Al), silicon (Si), tin (Sn), potassium (K), calcium (Ca), zinc (Zn), gallium (Ga), strontium (Sr), yttrium (Y), zirconium (Zr), niobium (Nb), molybdenum (Mo), barium (Ba), lanthanum (La), tungsten (W), or boron (B);
X is at least one of fluorine (F), chlorine (Cl), bromine (Br), iodine (I), or sulfur (S); and
x, y, and z satisfy $0.8 < x < 1.2$, $0 \leq y < 0.15$, and $0 \leq z < 0.05$.

As is apparent from Formula (1), the layered rock-salt lithium-cobalt composite oxide is a cobalt-based lithium composite oxide. The layered rock-salt lithium-cobalt composite oxide may further include one or more of first additional elements (M), and may further include one or more of second additional elements (X). Details of each of the first additional element (M) and the second additional element (X) are as described above.

In other words, as is apparent from a value range that y can take, the layered rock-salt lithium-cobalt composite oxide may include no first additional element (M). Similarly, as is apparent from a value range that z can take, the layered rock-salt lithium-cobalt composite oxide may include no second additional element (X).

The layered rock-salt lithium-cobalt composite oxide is not limited to a particular kind as long as the layered rock-salt lithium-cobalt composite oxide is a compound represented by Formula (1). Specific examples of the layered rock-salt lithium-cobalt composite oxide include $LiCoO_2$, $LiCo_{0.98}Al_{0.2}O_2$, $LiCo_{0.98}Mn_{0.02}O_2$, and $LiCo_{0.98}Mg_{0.02}O_2$.

It should be understood that that the positive electrode material may include, for example, one or more of other lithium compounds together with the lithium compound (the layered rock-salt lithium-cobalt composite oxide) described above. Examples of the other lithium compounds include another lithium composite oxide and a lithium phosphate compound.

The term "other lithium composite oxide" is a generic term for a composite oxide that includes, as constituent elements, lithium and one or more of other elements. The other lithium composite oxide has any of crystal structures including, without limitation, a layered rock-salt crystal structure and a spinel crystal structure, for example. However, a compound corresponding to the layered rock-salt lithium-cobalt composite oxide is excluded from the other lithium composite oxide described here. The term "lithium phosphate compound" is a generic term for a phosphate compound that includes, as constituent elements, lithium and one or more of the other elements. The lithium phosphate compound has a crystal structure such as an olivine crystal structure, for example. Details of the other elements are as described above.

Examples of the other lithium composite oxide having the layered rock-salt crystal structure include $LiNiO_2$. Examples of the other lithium composite oxide having the spinel crystal structure include $LiMn_2O_4$. Examples of the lithium phosphate compound having the olivine crystal structure include $LiFePO_4$, $LiMnPO_4$, and $LiMn_{0.5}Fe_{0.5}PO_4$.

The positive electrode binder includes one or more of materials including, without limitation, a synthetic rubber and a polymer compound, for example. Examples of the synthetic rubber include a styrene-butadiene-based rubber. Examples of the polymer compound include polyvinylidene difluoride and polyimide.

The positive electrode conductor includes, for example, one or more of electrically conductive materials such as a carbon material. Examples of the carbon material include graphite, carbon black, acetylene black, and Ketjen black. The electrically conductive material may be a material such as a metal material or an electrically conductive polymer.

As illustrated in FIGS. 2 and 3, the negative electrode 14 includes, for example, a negative electrode current collector 14A, and a negative electrode active material layer 14B provided on the negative electrode current collector 14A. The negative electrode active material layer 14B may be provided, for example, only on one side of the negative electrode current collector 14A, or on each of both sides of the negative electrode current collector 14A. FIG. 2 illustrates a case where the negative electrode active material layer 14B is provided on each of both sides of the negative electrode current collector 14A, for example.

The negative electrode current collector 14A includes, for example, an electrically conductive material such as copper. It is preferable that the negative electrode current collector 14A have a surface roughened by a method such as an electrolysis method. A reason for this is that improved adherence of the negative electrode active material layer 14B to the negative electrode current collector 14A is achievable by utilizing a so-called anchor effect.

The negative electrode active material layer 14B includes, as a negative electrode active material or negative electrode active materials, one or more of negative electrode materials into which lithium ions are insertable and from which lithium ions are extractable. The negative electrode active material layer 14B may further include another material such as a negative electrode binder or a negative electrode conductor.

As illustrated in FIG. 3, for example, the negative electrode active material layer 14B is not provided on an entire surface of the negative electrode current collector 14A, but is provided on a part of the surface. Here, the negative electrode active material layer 14B is provided, for example, in a region inside outer edges of the negative electrode current collector 14A, and has an area S2 defined by a width W2 (a dimension in the Y-axis direction) and a length L2 (a dimension in the X-axis direction). As a result, a margin (a region where no negative electrode active material layer 14B is provided) is given between: the outer edges of the negative electrode current collector 14A; and the negative electrode active material layer 14B. The negative electrode 14 is wound in a direction (the X-axis direction) along the length L2. In a case where the negative electrode active material layer 14B is provided on each of both sides of the negative electrode current collector 14A, the configuration of the negative electrode active material layer 14B described herein is applied, for example, to one negative electrode active material layer 14B provided on one side of the negative electrode current collector 14A, and to the other negative electrode active material layer 14B provided on the other side of the negative electrode current collector 14A. In FIG. 3, the negative electrode active material layer 14B is shaded darkly.

It should be understood that that the width W2 is greater than the width W1, and the length L2 is greater than the length L1. Therefore, the area S2 is greater than the area S1. A reason for this is that precipitation of lithium metal is suppressed when lithium ions extracted from the positive electrode 13 (the positive electrode active material layer 13B) are inserted into the negative electrode 14 (the negative electrode active material layer 14B) upon charging.

The negative electrode material includes a carbon material. The term "carbon material" is a generic term for a material mainly including carbon as a constituent element. A reason why the negative electrode material includes the carbon material is that a high energy density is stably obtainable owing to the crystal structure of the carbon material which hardly varies upon insertion and extraction of lithium ions. Another reason is that improved electrical conductivity of the negative electrode active material layer 14B is achievable owing to the carbon material which also serves as the negative electrode conductor.

Specifically, the negative electrode material includes graphite. The graphite is not limited to a particular kind. The graphite may be therefore artificial graphite, natural graphite, or both.

In a case where the negative electrode material includes pieces of particulate graphite (graphite particles), an average particle diameter (a median diameter D50) of the graphite particles is not particularly limited; however, the median diameter D50 is preferably from 3.5 μm to 30 μm both inclusive, and more preferably from 5 μm to 25 μm both inclusive. A reason for this is that precipitation of lithium metal is suppressed and occurrence of a side reaction is also suppressed. In detail, the median diameter D50 of smaller than 3.5 μm makes it easier for the side reaction to occur on surfaces of the graphite particles due to increased surface areas of the graphite particles, which may reduce initial-cycle charge and discharge efficiency. In contrast, if the median diameter D50 is larger than 30 μm, gaps (vacancies) between the graphite particles, which are flowing paths of the electrolytic solution, may be unevenly distributed, which may cause precipitation of lithium metal.

Here, it is preferable that some or all of the graphite particles form so-called secondary particles. A reason for this is that an orientation of the negative electrode 14 (the negative electrode active material layer 14B) is suppressed, thereby suppressing swelling of the negative electrode active material layer 14B upon charging and discharging. With respect to a weight of the graphite particles, a ratio of a weight occupied by graphite particles forming the secondary particles is not particularly limited; however, the ratio is preferably from 20 wt % to 80 wt % both inclusive in particular. If the ratio of graphite particles forming the secondary particles is relatively high, a total surface area of the particles is excessively increased due to a relatively small average particle diameter of primary particles, which may cause a decomposition reaction of the electrolytic solution to occur and a capacity per unit weight to be decreased.

In a case where graphite is analyzed by X-ray diffractometry (XRD), spacing of a graphene layer, having a graphite crystal structure, determined from a position of a peak derived from a (002) plane, that is, spacing S of the (002) plane, is preferably from 0.3355 nm to 0.3370 nm both inclusive, and more preferably from 0.3356 nm to 0.3363 nm both inclusive. A reason for this is that the decomposition reaction of the electrolytic solution is reduced while securing the battery capacity. In detail, if the spacing S is greater than 0.3370 nm, the battery capacity may be reduced due to inadequate graphitization of graphite. In contrast, if the spacing S is smaller than 0.3355 nm, a reactivity of the graphite to the electrolytic solution increases due to excessive graphitization of the graphite, which may cause the decomposition reaction of the electrolytic solution to occur.

The negative electrode material may include, for example, one or more of other materials together with the carbon material (graphite) described above. Examples of the other materials include another carbon material and a metal-based material. A reason why the negative electrode material may include one or more of the other materials is that the energy density further increases.

Examples of the other carbon material include non-graphitizable carbon. A reason for this is that a high energy density is stably achievable. A physical property of the non-graphitizable carbon is not particularly limited; however, in particular, spacing of the (002) plane is preferably greater than or equal to 0.37 nm. A reason for this is that a sufficient energy density is achievable.

The term "metal-based material" is a generic term for a material including, as a constituent element or constituent elements, one or more of: metal elements that are each able to form an alloy with lithium; and metalloid elements that are each able to form an alloy with lithium. The metal-based material may be a simple substance, an alloy, a compound, a mixture of two or more thereof, or a material including one or more phases thereof.

It should be understood that that the simple substance described here merely refers to a simple substance in a general sense. The simple substance may therefore include a small amount of impurity, that is, does not necessarily have a purity of 100%. The term "alloy" encompasses, for example, not only a material that includes two or more metal elements but may also encompass a material that includes one or more metal elements and one or more metalloid elements. The alloy may further include one or more non-metallic elements. The metal-based material has a state such as a solid solution, a eutectic (a eutectic mixture), an intermetallic compound, or a state including two or more thereof that coexist, although not particularly limited thereto.

Specific examples of the metal element and the metalloid element include magnesium, boron, aluminum, gallium, indium, silicon, germanium, tin, lead, bismuth, cadmium, silver, zinc, hafnium, zirconium, yttrium, palladium, and platinum.

Among the above-described materials, a material including silicon as a constituent element is preferable. Hereinafter, the material including silicon as a constituent element is referred to as a "silicon-containing material". A reason why the silicon-containing material is preferable is that a markedly high energy density is obtainable owing to superior lithium-ion insertion capacity and superior lithium-ion extraction capacity thereof.

The silicon alloy includes, as a constituent element or constituent elements other than silicon, for example, one or more of tin, nickel, copper, iron, cobalt, manganese, zinc, indium, silver, titanium, germanium, bismuth, antimony, and chromium. The silicon compound includes, as a constituent element or constituent elements other than silicon, for example, one or more of materials including, without limitation, carbon and oxygen. The silicon compound may include, as a constituent element or constituent elements other than silicon, one or more of the series of constituent elements described in relation to the silicon alloy, for example.

Specific examples of the silicon-containing material include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $CuSi$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, and a silicon oxide represented by Formula (5) below. In particular, the silicon oxide is preferable. A reason for this is that the silicon oxide has a relatively large capacity per unit weight and a relatively large capacity per unit volume in graphite ratios. Another reason is that, in the silicon oxide which includes oxygen, a structure thereof is stabilized by an oxygen-silicon bond and a lithium-oxygen bond after being lithiated, thereby suppressing cracking of the particles. The silicon oxide is not limited to a particular kind, and examples thereof include SiO.

$$SiO_v \tag{5}$$

where v satisfies $0.5 \leq v \leq 1.5$.

Details of the negative electrode binder are similar to those of the positive electrode binder, for example. Details of the negative electrode conductor are similar to those of the positive electrode conductor, for example. However, the negative electrode binder may be, for example, a water-based (water-soluble) polymer compound. Examples of the water-soluble polymer compound include carboxymethyl cellulose and a metal salt thereof.

The separator 15 is interposed between the positive electrode 13 and the negative electrode 14, and causes the positive electrode 13 and the negative electrode 14 to be separated away from each other. The separator 15 includes a porous film of a material such as a synthetic resin or ceramic, for example. The separator 15 may be a stacked film including two or more porous films that are stacked on each other, in one example. Examples of the synthetic resin include polyethylene.

The electrolytic solution includes, for example, a solvent and an electrolyte salt. Only one solvent may be used, or two or more solvents may be used. Only one electrolyte salt may be used, or two or more electrolyte salts may be used.

The solvent includes one or more of non-aqueous solvents (organic solvents), for example. An electrolytic solution including the non-aqueous solvent is a so-called non-aqueous electrolytic solution.

The non-aqueous solvent is not limited to a particular kind, and examples thereof include a cyclic carbonate ester, a chain carbonate ester, a lactone, a chain carboxylate ester, and/or a nitrile (mononitrile) compound. A reason why such a non-aqueous solvent may be used is that characteristics including, without limitation, a capacity characteristic, a cyclability characteristic, and a storage characteristic are secured.

Examples of the cyclic carbonate ester include ethylene carbonate and propylene carbonate. Examples of the chain carbonate ester include dimethyl carbonate and diethyl carbonate. Examples of the lactone include γ-butyrolactone and γ-valerolactone. Examples of the chain carboxylate ester include methyl acetate, ethyl acetate, methyl propionate, and propyl propionate. Examples of the nitrile compound include acetonitrile, methoxy acetonitrile, and 3-methoxy propionitrile.

Examples of the non-aqueous solvent further include an unsaturated cyclic carbonate ester, a halogenated carbonate ester, a sulfonate ester, an acid anhydride, a dicyano compound (a dinitrile compound), a diisocyanate compound, and a phosphate ester. A reason why such a non-aqueous solvent may be used is that one or more of the above-described characteristics including, without limitation, a capacity characteristic are further improved.

Examples of the unsaturated cyclic carbonate ester include vinylene carbonate, vinyl ethylene carbonate, and methylene ethylene carbonate. The halogenated carbonate ester may be a cyclic halogenated carbonate ester or a chain halogenated carbonate ester. Examples of the halogenated carbonate ester include 4-fluoro-1,3-dioxolane-2-one, 4,5-difluoro-1,3-dioxolane-2-one, and fluoromethyl methyl carbonate. Examples of the sulfonate ester include 1,3-propane sultone and 1,3-propene sultone. Examples of the acid anhydride include succinic anhydride, glutaric anhydride, maleic anhydride, ethane disulfonic anhydride, propane disulfonic anhydride, sulfobenzoic anhydride, sulfopropionic anhydride, and sulfobutyric anhydride. Examples of the dinitrile compound include succinonitrile, glutaronitrile, adiponitrile, and phthalonitrile. Examples of the diisocyanate compound include hexamethylene diisocyanate. Examples of the phosphate ester include trimethyl phosphate and triethyl phosphate.

The electrolyte salt includes one or more of lithium salts, for example. The electrolyte salt may further include one or more of light metal salts other than the lithium salt. The lithium salt is not limited to a particular kind, and examples thereof include lithium hexafluorophosphate ($LiPF_6$), lithium tetrafluoroborate ($LiBF_4$), lithium bis(fluorosulfonyl)imide ($LiN(SO_2F)_2$), lithium bis(trifluoromethane sulfonyl)imide ($LiN(CF_3SO_2)_2$), lithium fluorophosphate ($Li_2PFO_3$), lithium difluorophosphate ($LiPF_2O_2$), and lithium bis(oxalato)borate ($LiC_4BO_8$). A reason why the electrolyte salt may include such a lithium salt is that characteristics including, without limitation, a capacity characteristic, a cyclability characteristic, and a storage characteristic are secured.

A content of the electrolyte salt is, for example, greater than or equal to 0.3 mol/kg and less than or equal to 3.0 mol/kg with respect to the solvent, but is not particularly limited thereto.

The positive electrode lead 11 is coupled to the positive electrode 13, and is led out from inside to outside the outer package member 20. The positive electrode lead 11 includes, for example, an electrically conductive material such as aluminum. The positive electrode lead 11 has a shape such as a thin plate shape or a meshed shape, for example.

The negative electrode lead 12 is coupled to the negative electrode 14, and is led out from inside to outside the outer package member 20. A lead-out direction of the negative electrode lead 12 is, for example, similar to a lead-out direction of the positive electrode lead 11. The negative electrode lead 12 includes, for example, an electrically conductive material such as nickel. The negative electrode lead 12 has a shape similar to the shape of the positive electrode lead 11, for example.

Figure 4:
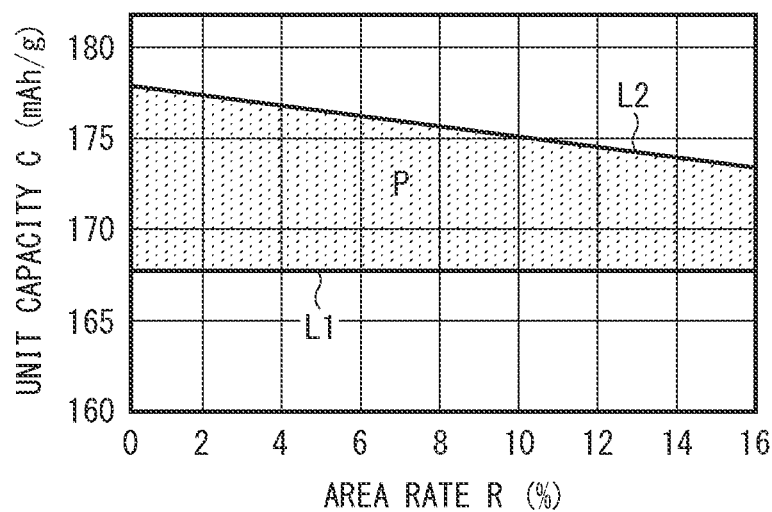
FIG. 4 is a graph of a correlative relationship between a unit capacity and an area rate.

FIG. 4 represents a correlative relationship between the unit capacity C (mAh/g) and an area rate R (%). In FIG. 4, a region P provided between a lower-limit line L1 and an upper-limit line L2, which will be described later, is shaded. A potential to be described below is an open circuit potential to be measured with lithium metal as a reference electrode, i.e., a potential versus a lithium reference electrode.

In order to improve an energy density of the secondary battery, it is conceivable to increase an upper limit of a battery voltage (a closed circuit voltage) upon charging, i.e., a charge voltage (or an end-of-charge voltage). Increase in the charge voltage raises a potential of the positive electrode 13 at an end of charging, which causes increase in a use range of the potential, i.e., a potential range to be used in the positive electrode 13 during charging.

In a case where the layered rock-salt lithium-cobalt composite oxide is used as the positive electrode active material, a potential constant region associated with a phase transition (O3/H1–3 transition) generally exists. Increase in the charge voltage increases the potential of the positive electrode 13 in the end stage of charging, which causes the potential of the positive electrode 13 to reach inside the potential constant region. Accordingly, a capacity potential curve (in which a horizontal axis represents a capacity (mAh) and a vertical axis represents a potential (V)) of the positive electrode 13 has a positive electrode potential constant region described above. The positive electrode potential varying region is a region in which the potential hardly varies even if the capacity varies in the positive electrode 13.

If the secondary battery including the layered rock-salt lithium-cobalt composite oxide is charged and discharged in such a manner that the potential of the positive electrode 13 reaches inside the potential constant region associated with the phase transition, or the potential of the positive electrode 13 passes through the potential constant region associated with the phase transition, a capacity loss relatively easily occurs and gas generation also relatively easily occurs. In particular, if the charge voltage is 4.42 V or higher, the potential of the positive electrode 13 becomes easier to reach the potential constant region P2 associated with the phase transition, or the potential of the positive electrode 13 becomes easier to pass through the potential constant region associated with the phase transition. Such tendencies are relatively strong when the secondary battery is used and stored in a high-temperature environment.

In contrast, if the charge voltage is increased in a case where graphite is used as the negative electrode active material, a two-phase coexistence reaction of an intercalation compound stage 1 and an interlayer compound stage 2 proceeds in the graphite. As a result, a capacity potential curve of the negative electrode 14 has a negative electrode potential constant region. The negative electrode potential constant region is a region in which the potential hardly varies even if the capacity varies in association with the two-phase coexistence reaction. A potential of the negative electrode 14 in the negative electrode potential constant region is about 90 mV to about 100 mV.

Here, in a case where the potential of the negative electrode 14 is set to cause the charging to be completed in the negative electrode potential constant region in order to suppress precipitation of lithium metal on the negative electrode 14 at the end of charging, the potential of the positive electrode 13 becomes high at the end of charging. This makes it easier for the potential of the positive electrode 13 to reach inside the potential constant region associated with the phase transition, or to pass through the potential constant region associated with the phase transition. Such tendencies become stronger as the charge voltage is increased, because the increase in the charge voltage raises the potential of the positive electrode 13.

Even if the charge voltage is increased, in order to prevent the potential of the positive electrode 13 from easily reaching inside the potential constant region associated with the phase transition, or to prevent the potential of the positive electrode 13 from easily passing through the potential constant region associated with the phase transition, a condition below regarding the unit capacity C in the relationship with the area rate R is satisfied as illustrated in FIG. 4.

Specifically, when the secondary battery is charged and discharged with a charge voltage of 4.42 V or higher, a unit capacity C (mAh/g) represented by Formula (2) below satisfies, in a relationship with an area rate R (%) represented by Formula (3) below, a condition represented by Formula (4) below (hereinafter, referred to as "appropriate condition"). It should be understood that that a value of the unit capacity C is a value obtained by rounding off to the nearest whole number. A value of the area rate R is a value obtained by rounding off to the nearest tenth. A value of (−0.28×area rate R+178) is a value obtained by rounding off to the nearest whole number.

Unit capacity $C$ (mAh/g)=rated capacity $A$ (mAh)/ weight $M$ (g) of positive electrode active material layer 13$B$ (2)

where the rated capacity A is a capacity measured by the secondary battery being charged with a constant current until the battery voltage (the closed circuit voltage) reaches 4.42 V or higher, and the secondary battery being charged with a constant voltage of the battery voltage (the closed circuit voltage) of 4.42 V or higher, following which the secondary battery being discharged with a constant current.

$$\text{Area rate } R(\%) = [1-(\text{area } S1 \text{ (cm}^2\text{) of positive electrode active material layer } 13B/\text{area } S2 \text{ (cm}^2\text{) of negative electrode active material layer } 14B)] \times 100 \quad (3).$$

$$168 \text{ mAh/g} \le \text{unit capacity } C \text{ (mAh/g)} \le (-0.28 \times \text{area rate } R(\%)+178) \text{ mAh/g} \quad (4).$$

That is, when the secondary battery is charged and discharged with the charge voltage of 4.42 V or higher, the appropriate condition regarding the unit capacity C in the relationship with the area rate R is satisfied. The charge voltage is not particularly limited as long as it is 4.42 V or higher. Specifically, in a case where three charge voltages are set, the charge voltages are, for example, 4.42 V, 4.45 V, and 4.48 V. In this case, the above-described condition regarding the unit capacity C is satisfied if the charge voltage is set to 4.42 V, the above-described condition regarding the unit capacity C is satisfied if the charge voltage is set to 4.45 V, and the above-described condition regarding the unit capacity C is satisfied if the charge voltage is set to 4.48 V.

A reason why the appropriate condition regarding the unit capacity C in the relationship with the area rate R is satisfied is that, as described above, the potential of the positive electrode 13 is prevented from easily reaching inside the potential constant region associated with the phase transition, or the potential of the positive electrode 13 is prevented from easily passing through the potential constant region associated with the phase transition, at the end of charging. As a result, even if the charge voltage is increased in order to improve energy density, the capacitive loss is suppressed and the gas generation is also suppressed. In this case, particularly when the secondary battery is used and stored in a high-temperature environment, the potential of the positive electrode 13 is prevented from easily reaching inside the potential constant region associated with the phase transition, or the potential of the positive electrode 13 is prevented from easily passing through the potential constant region associated with the phase transition.

In FIG. 4, the lower-limit line L1 represents a lower limit (=168 mAh/g) of the appropriate condition of the unit capacity C described above, and the upper-limit line L2 represents an upper limit ((−0.28× area rate R+178) mAh/g) of the appropriate condition of the unit capacity C described above. That is, the upper-limit line L2 is a line represented by y=−0.28x+178, where y is the unit capacity C and x is the area rate R. Thus, in FIG. 4, a range in which the appropriate condition regarding the unit capacity C in the relationship with the area rate R is satisfied is a region P between the lower-limit line L1 and the upper-limit line L2.

Respective details (definitions and measuring methods) related to the unit capacity C, the rated capacity A, the weight M, the area rate R, the area S1, and the area S2 are, for example, as described below.

The rated capacity A is a capacity (a discharge capacity) measured by charging and discharging the secondary battery under the following charging and discharging conditions.

In a case where the charge voltage is set to 4.42 V, the discharge capacity at the time of charging and discharging the secondary battery in an ambient-temperature environment (at a temperature of 25±2° C.) is measured to thereby determine the measured discharge capacity as the rated capacity A. Upon charging, the secondary battery is charged with a constant current of 0.5 C until the battery voltage reaches 4.42 V, following which the secondary battery is charged with a constant voltage of the battery voltage of 4.42 V until the current reaches 0.025 C. Upon discharging, the secondary battery is discharged with a constant current of 0.2 C until the battery voltage reaches 3.0 V. It should be understood that that 0.5 C, 0.025 C, and 0.2 C are values of currents that cause battery capacities (theoretical capacities) to be completely discharged in 2 hours, 40 hours, and 5 hours, respectively.

Here, regarding the battery capacity, in a case where a value of the battery capacity is written on, for example, a main body of the secondary battery, a label stuck to the secondary battery, or an attached document of the secondary battery (e.g., an instruction manual), the written value is identified as the battery capacity. If such a value of the battery capacity is not written, the battery capacity is identified by checking the value of the battery capacity submitted to a certification authority on the basis of, for example, a type of the secondary battery.

However, in a case where the secondary battery immediately after completion is used for determining the rated capacity A, for example, the secondary battery is charged and discharged in advance before measuring the discharge capacity, in order to stabilize a state of the secondary battery, that is, in order to form an SEI film on the surface of the negative electrode 14 or the like. Charging and discharging conditions are as described above.

It should be understood that that, in a case where the charge voltage is set to 4.45 V, the discharge capacity is measured by a similar procedure except that the charge voltage is changed from 4.42 V to 4.45 V to thereby determine the measured discharge capacity as the rated capacity A. In a case where the charge voltage is set to 4.48 V, the discharge capacity is measured by a similar procedure except that charge voltage is changed from 4.42 V to 4.48 V to thereby determine the measured discharge capacity as the rated capacity A.

In a case of determining the weight M, first, the secondary battery is disassembled to thereby collect the positive electrode 13, following which the weight of the positive electrode 13 is measured. Thereafter, the positive electrode active material layer 13B provided on the positive electrode current collector 13A is removed, following which the weight of the positive electrode current collector 13A is measured. In this case, the positive electrode active material layer 13B (the negative electrode binder, etc.) may be dissolved and removed using a material such as an organic solvent on an as-needed basis. Lastly, the weight M of the positive electrode active material layer 13B is calculated by subtracting the weight of the positive electrode current collector 13A from the weight of the positive electrode 13.

The area S1 is an area of a region where the positive electrode active material layer 13B is provided on the surface of the positive electrode current collector 13A, as described above. In a case of determining the area S1, first, the secondary battery is discharged in an ambient-temperature environment (at a temperature of 25±2° C.). In this case, the secondary battery is discharged with a constant current of 0.2 C until the battery voltage reaches 3.0 V. Thereafter, the secondary battery is disassembled to thereby collect the positive electrode 13. Lastly, as illustrated in FIG. 3, the width W1 and the length L1 are measured to thereby calculate the area S1 (=width W1×length L1). A reason why the secondary battery is discharged in advance for determining the area S1 (the width W1 and the length L1) is that an error in area S1 calculation caused by the contraction of the positive electrode 13 in the charged secondary battery is reduced. Accordingly, the area S1 is a so-called effective area of the positive electrode active material layer 13B. In a case where another member such as a protective tape is overlapped on the positive electrode active material layer 13B, an area of a region on which the other member is overlapped is excluded from the area S1.

The area S2 is an area of a region where the negative electrode active material layer 14B is provided on the surface of the negative electrode current collector 14A, as described above. A procedure for determining the area S2 is similar to the procedure for determining the area S1, except that the width W2 and the length L2 are measured using the negative electrode 14 (the negative electrode current collector 14A and the negative electrode active material layer 14B) and thereafter the area S2 (=width W2×length L2) is calculated. A reason why the secondary battery is discharged in advance for determining the area S2 (the width W2 and the length L2) is that an error in area S2 calculation caused by the expansion of the negative electrode 14 in the charged secondary battery is reduced. Accordingly, the area S2 is a so-called effective area of the negative electrode active material layer 14B.

In a case of determining the area rate R, the area S1 and the area S2 are calculated by the respective procedures described above, following which the area rate R is calculated on the basis of Formula (3). In a case of determining the unit capacity C, the rated capacity A is measured and the weight M is calculated by the respective procedures described above, following which the unit capacity C is calculated on the basis of Formula (2).

The secondary battery operates as follows, for example. Upon charging the secondary battery, lithium ions are extracted from the positive electrode 13, and the extracted lithium ions are inserted into the negative electrode 14 via the electrolytic solution. Upon discharging the secondary battery, lithium ions are extracted from the negative electrode 14, and the extracted lithium ions are inserted into the positive electrode 13 via the electrolytic solution.

In a case of manufacturing the secondary battery, the positive electrode 13 and the negative electrode 14 are fabricated and thereafter the secondary battery is assembled using the positive electrode 13 and the negative electrode 14, for example, as described below.

First, the positive electrode active material including the layered rock-salt lithium-cobalt composite oxide is mixed with materials including, without limitation, the positive electrode binder and the positive electrode conductor on an as-needed basis to thereby obtain a positive electrode mixture. Thereafter, the positive electrode mixture is dispersed or dissolved into a solvent such as an organic solvent to thereby prepare a paste positive electrode mixture slurry. Lastly, the positive electrode mixture slurry is applied on both sides of the positive electrode current collector 13A, following which the applied positive electrode mixture slurry is dried to thereby form the positive electrode active material layers 13B. Thereafter, the positive electrode active material layers 13B may be compression-molded by means of a machine such as a roll pressing machine. In this case, the positive electrode active material layers 13B may be heated. The positive electrode active material layers 13B may be compression-molded a plurality of times.

The negative electrode active material layers 14B are formed on both sides of the negative electrode current collector 14A by a procedure similar to the fabrication procedure of the positive electrode 13 described above. Specifically, the negative electrode active material including graphite is mixed with materials including, without limitation, the negative electrode binder and the negative electrode conductor on an as-needed basis to thereby obtain a negative electrode mixture. Thereafter, the negative electrode mixture is dispersed or dissolved into a solvent such as an organic solvent or an aqueous solvent to thereby prepare a paste negative electrode mixture slurry. Thereafter, the negative electrode mixture slurry is applied on both sides of the negative electrode current collector 14A, following which the applied negative electrode mixture slurry is dried to thereby form the negative electrode active material layers 14B. In this case, the area S2 of each of the negative electrode active material layers 14B is caused to be greater than the area S1 of the positive electrode active material layer 13B. Thereafter, the negative electrode active material layers 14B may be compression-molded.

In the case of fabricating the positive electrode 13 and the negative electrode 14, a mixture ratio between the positive electrode active material and the negative electrode active material (a relationship between mass of the positive electrode active material and mass of the negative electrode active material) is adjusted in such a manner that the mass of the positive electrode active material is sufficiently greater, to thereby satisfy the appropriate condition regarding the unit capacity C in the relationship with the area rate R.

First, the positive electrode lead 11 is coupled to the positive electrode 13 (the positive electrode current collector 13A) by a method such as a welding method, and the negative electrode lead 12 is coupled to the negative electrode 14 (the negative electrode current collector 14A) by a method such as a welding method. Thereafter, the positive electrode 13 and the negative electrode 14 are stacked on each other with the separator 15 interposed therebetween, following which the stack of the positive electrode 13, the negative electrode 14, and the separator 15 is wound to thereby form a wound body. In this case, an unillustrated jig having an elongated shape is used to wind the positive electrode 13, the negative electrode 14, and the separator 15 about the winding axis J to thereby cause the wound body to be in the elongated shape as illustrated in FIG. 1.

Thereafter, the outer package member 20 is folded in such a manner as to sandwich the wound body, following which the outer edges excluding one side of the outer package member 20 are bonded to each other by a method such as a thermal fusion bonding method. Thus, the wound body is placed into the pouch-shaped outer package member 20. Lastly, the electrolytic solution is injected into the pouch-shaped outer package member 20, following which the outer package member 20 is sealed by a method such as a thermal fusion bonding method. In this case, the sealing film 31 is disposed between the outer package member 20 and the positive electrode lead 11, and the sealing film 32 is disposed between the outer package member 20 and the negative electrode lead 12. The wound body is thereby impregnated with the electrolytic solution, forming the wound electrode body 10. Thus, the wound electrode body 10 is housed in the outer package member 20. As a result, the secondary battery is completed.

According to the secondary battery, in a case where the positive electrode 13 includes the positive electrode active material (the layered rock-salt lithium-cobalt composite oxide) and where the negative electrode 14 includes the negative electrode active material (graphite), the appropriate condition regarding the unit capacity C in the relationship with the area rate R is satisfied. In this case, as compared with the case where the appropriate condition regarding the unit capacity C in the relationship with the area rate R is not satisfied, even if the charge voltage is increased: the potential E of the positive electrode 13 is prevented from easily reaching the potential constant region associated with the phase transition, or the potential E of the positive electrode 13 is prevented from easily passing through the potential constant region associated with the phase transition. As a result, the capacity loss and the gas generation are suppressed. Accordingly, it is possible to achieve superior battery characteristics.

In particular, the median diameter D50 of the graphite particles may be from 3.5 μm to 30 μm both inclusive. This suppresses the precipitation of lithium metal and also suppresses the occurrence of the side reaction, making it possible to achieve higher effects accordingly. Moreover, the spacing S of the (002) plane of graphite may be from 0.3355 nm to 0.3370 nm both inclusive. This reduces the decomposition reaction of the electrolytic solution while securing the battery capacity, which makes it possible to achieve higher effects accordingly.

Here, in order to prevent the potential E of the positive electrode 13 from easily reaching the potential constant region associated with the phase transition, or prevent the potential E of the positive electrode 13 from easily passing through the potential constant region associated with the phase transition, due to the increase in the potential of the positive electrode 13, it is conceivable to increase, for example, a ratio of an area density of the positive electrode 13 to an area density of the negative electrode 14 (an area density ratio). However, in a case where the area density ratio is simply increased, the increase in the dimension (the area rate R) of the secondary battery causes lithium ions to move, upon charging, from the positive electrode active material layer 13B to an excess region (a region that does not oppose the positive electrode active material layer 13B) of the negative electrode active material layer 14B. As a result, an amount of the capacity loss at the time of charging increases in the negative electrode 14, and the capacity at the time of charging increases in the positive electrode 13, thereby increasing the potential of the positive electrode 13 at the end of charging. Accordingly, depending on the dimension of the secondary battery, the potential E of the positive electrode 13 still easily reaches the potential constant region associated with the phase transition, or the potential E of the positive electrode 13 still easily passes through the potential constant region associated with the phase transition, making it easier to deteriorate battery characteristics. Needless to say, such a tendency becomes stronger with the increase in the charge voltage.

In contrast, in the secondary battery according to the embodiment, the appropriate condition regarding the unit capacity C in the relationship with the area rate R is satisfied. Accordingly, unlike the case where the area density ratio is simply increased, and the unit capacity C is made appropriate in a relationship with the charge voltage and the dimension of the secondary battery. This prevents the potential E of the positive electrode 13 from easily reaching the potential constant region P2 associated with the phase transition, or prevents the potential E of the positive electrode 13 from easily passing through the potential constant region P2 associated with the phase transition, without depending on the charge voltage and the dimension of the secondary battery. Therefore, even if the charge voltage and the dimension of secondary battery are changed, the battery characteristics are prevented from being easily deteriorated.

The configurations of the secondary batteries described above are appropriately modifiable as described below. It should be understood that that any two or more of the following series of modifications may be combined.

Figure 5:
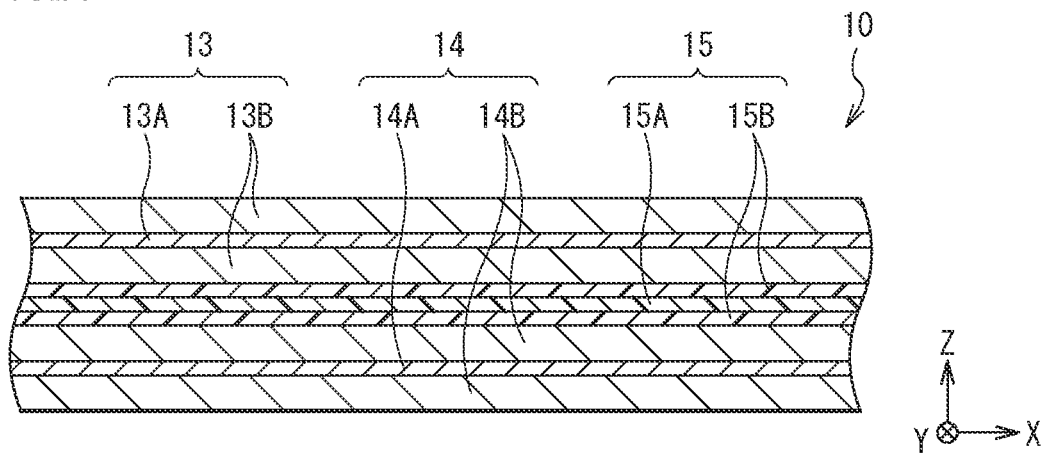
FIG. 5 is a sectional view of a configuration of a secondary battery according to an embodiment of the present technology.

FIG. 5 illustrates a sectional configuration of a secondary battery (the wound electrode body 10) of Modification 1, and corresponds to FIG. 2. As illustrated in FIG. 5, the separator 15 may include, for example, a base layer 15A and a polymer compound layer 15B provided on the base layer 15A. The polymer compound layer 15B may be provided on only one side of the base layer 15A, or on each of both sides of the base layer 15A. FIG. 5 illustrates a case where the polymer compound layer 15B is provided on each of both sides of the base layer 15A, for example.

The base layer 15A is, for example, the porous film described above. The polymer compound layer 15B includes, for example, a polymer compound such as polyvinylidene difluoride. A reason for this is that such a polymer compound has superior physical strength and is electrochemically stable. It should be understood that that the polymer compound layer may include insulating particles such as inorganic particles. A reason for this is that safety improves. The inorganic particles are not limited to a particular kind, and examples thereof include aluminum oxide and aluminum nitride.

In a case of fabricating the separator 15, for example, a precursor solution that includes materials including, without limitation, the polymer compound and an organic solvent is prepared to thereby apply the precursor solution on each of both sides of the base layer 15A. Thereafter, the precursor solution is dried to thereby form the polymer compound layers 15B.

Also in this case, similar effects are obtainable by satisfying the appropriate condition regarding the unit capacity C in the relationship with the area rate R. In particular, adherence of the separator 15 to the positive electrode 13 is improved and adherence of the separator 15 to the negative electrode 14 is improved, suppressing distortion of the wound electrode body 10. This reduces a decomposition reaction of the electrolytic solution and also suppresses leakage of the electrolytic solution with which the base layer 15A is impregnated, making it possible to achieve higher effects accordingly.

Figure 6:
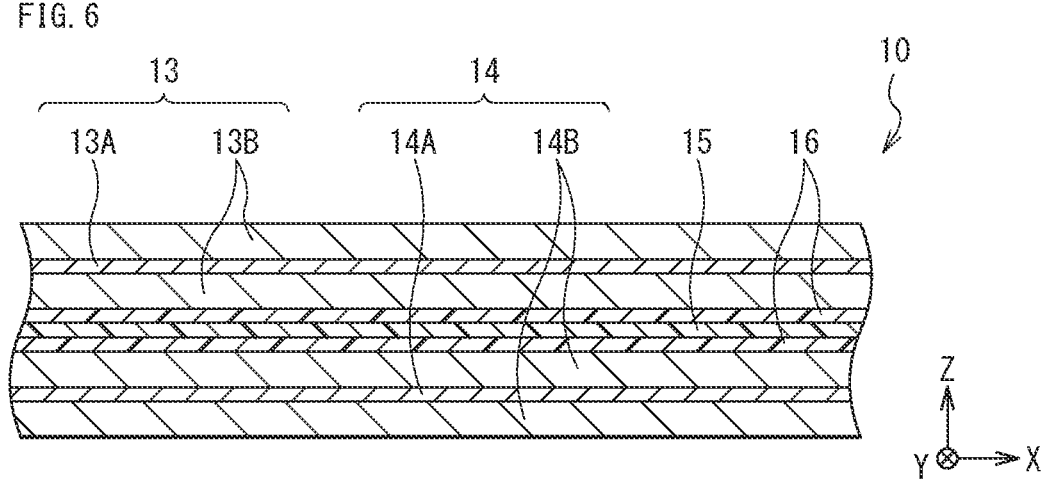
FIG. 6 is a sectional view of a configuration of a secondary battery according to an embodiment of the present technology.

FIG. 6 illustrates a sectional configuration of a secondary battery (the wound electrode body 10) of Modification 2, and corresponds to FIG. 2. As illustrated in FIG. 6, the wound electrode body 10 may include, for example, an electrolyte layer 16 which is a gel electrolyte instead of the electrolytic solution which is a liquid electrolyte.

As illustrated in FIG. 6, in the wound electrode body 10, the positive electrode 13 and the negative electrode 14 are stacked with the separator 15 and the electrolyte layer 16 interposed therebetween, and the stack of the positive electrode 13, the negative electrode 14, the separator 15, and the electrolyte layer 16 is wound, for example. The electrolyte layer 16 is interposed, for example, between the positive electrode 13 and the separator 15, and between the negative electrode 14 and the separator 15. However, the electrolyte layer 16 may be interposed only between the positive electrode 13 and the separator 15 or only between the negative electrode 14 and the separator 15.

The electrolyte layer 16 includes a polymer compound together with the electrolytic solution. As described above, the electrolyte layer 16 described here is the gel electrolyte; thus, the electrolytic solution is held by the polymer compound in the electrolyte layer 16. A configuration of the electrolytic solution is as described above. Regarding the electrolyte layer 16 which is the gel electrolyte, the concept of the solvent included in the electrolytic solution is broad and encompasses not only a liquid material but also an ion-conductive material that is able to dissociate the electrolyte salt. Accordingly, the ion-conductive polymer compound is also encompassed by the solvent. The polymer compound includes, for example, a homopolymer, a copolymer, or both. Examples of the homopolymer include polyvinylidene difluoride. Examples of the copolymer include a copolymer of vinylidene fluoride and hexafluoropyrene.

In a case of forming the electrolyte layer 16, for example, a precursor solution that includes materials including, without limitation, the electrolytic solution, the polymer compound, and an organic solvent is prepared to thereby apply the precursor solution on each of the positive electrode 13 and the negative electrode 14, following which the applied precursor solution is dried.

Also in this case, similar effects are obtainable by satisfying the appropriate condition regarding the unit capacity C in the relationship with the area rate R. In particular, this case suppresses leakage of the electrolytic solution, making it possible to achieve higher effects accordingly.

The applications of the secondary battery are not particularly limited as long as they are, for example, machines, apparatuses, instruments, devices, or systems (assembly of a plurality of apparatuses, for example) in which the secondary battery is usable as a driving power source, an electric power storage source for electric power accumulation, or any other source. The secondary battery used as a power source may serve as a main power source or an auxiliary power source. The main power source is preferentially used regardless of the presence of any other power source. The auxiliary power source may be used in place of the main power source, or may be switched from the main power source on an as-needed basis. In a case where the secondary battery is used as the auxiliary power source, the kind of the main power source is not limited to the secondary battery.

Specific examples of the applications of the secondary battery include: electronic apparatuses including portable electronic apparatuses; portable life appliances; storage devices; electric power tools; battery packs mountable on laptop personal computers or other apparatuses as a detachable power source; medical electronic apparatuses; electric vehicles; and electric power storage systems. Examples of the electronic apparatuses include video cameras, digital still cameras, mobile phones, laptop personal computers, cordless phones, headphone stereos, portable radios, portable televisions, and portable information terminals. Examples of the portable life appliances include electric shavers. Examples of the storage devices include backup power sources and memory cards. Examples of the electric power tools include electric drills and electric saws. Examples of the medical electronic apparatuses include pacemakers and hearing aids. Examples of the electric vehicles include electric automobiles including hybrid automobiles. Examples of the electric power storage systems include home battery systems for accumulation of electric power for emergency. Needless to say, the secondary battery may have applications other than those described above.

EXAMPLES

A description is given of Examples of the present technology below.

Experiment Examples 1-1 to 1-54

Laminated secondary batteries (lithium-ion secondary batteries) illustrated in FIGS. 1 and 2 were fabricated, following which battery characteristics of the secondary batteries were evaluated as described below.

In a case of fabricating the positive electrode 13, first, 91 parts by mass of the positive electrode active material (lithium cobalt oxide ($LiCoO_2$) serving as the layered rock-salt lithium-cobalt composite oxide), 3 parts by mass of the positive electrode binder (polyvinylidene difluoride), and 6 parts by mass of the positive electrode conductor (graphite) were mixed with each other to thereby obtain a positive electrode mixture. Thereafter, the positive electrode mixture was put into an organic solvent (N-methyl-2-pyrrolidone), following which the organic solvent was stirred to thereby prepare a paste positive electrode mixture slurry. Thereafter, the positive electrode mixture slurry was applied on both sides of the positive electrode current collector 13A (a band-shaped aluminum foil having a thickness of 12 m) by means of a coating apparatus, following which the applied positive electrode mixture slurry was dried to thereby form the positive electrode active material layers 13B (each having the width W1 and the length L1). Lastly, the positive electrode active material layers 13B were compression-molded by means of a roll pressing machine.

In a case of fabricating the negative electrode 14, first, 97 parts by mass of the negative electrode active material (artificial graphite having a median diameter D50 of 10 μm and spacing S of the (002) plane of 0.3360 μm), and 1.5 parts by mass of the negative electrode binder (sodium carboxymethyl cellulose) were mixed with each other to thereby obtain a negative electrode mixture precursor. Thereafter, the negative electrode mixture precursor was put into an aqueous solvent (deionized water), following which 1.5 parts by mass, in terms of solid content, of the negative electrode binder (a styrene-butadiene-rubber dispersion liquid) was put into the aqueous solvent to thereby prepare a paste negative electrode mixture slurry. Thereafter, the negative electrode mixture slurry was applied on both sides of the negative electrode current collector 14A (a band-shaped copper foil having a thickness of 15 μm) by means of a coating apparatus, following which the applied negative electrode mixture slurry was dried to thereby form the negative electrode active material layers 14B (each having the width W2 and the length L2). Lastly, the negative electrode active material layers 14B were compression-molded by means of a roll pressing machine.

In the case of fabricating the positive electrode 13 and the negative electrode 14, the area S1 ($cm^2$) of the positive electrode active material layer 13B and the area S2 ($cm^2$) of the negative electrode active material layer 14B were each adjusted to thereby vary the area rate R (%). Further, an amount of the positive electrode active material was adjusted to thereby vary the rated capacity A (mAh), and the weight M (g) of the positive electrode active material layer 13B and the rated capacity A (mAh) were each adjusted to thereby vary the unit capacity C (mAh/g). It should be understood that that the charge voltage Ec (V), and the upper limit ($=(-0.28 \times R+178)$ mAh/g) of the appropriate condition of the unit capacity C calculated on the basis of the area rate R were as described in Tables 1 to 4.

In a case of preparing the electrolytic solution, the electrolyte salt (lithium hexafluorophosphate) was added to a solvent (ethylene carbonate, propylene carbonate, and diethyl carbonate), following which the solvent was stirred. In this case, a mixture ratio (a weight ratio) between ethylene carbonate, propylene carbonate, and diethyl carbonate in the solvent was set to 15:15:70, and a content of the electrolyte salt with respect to the solvent was set to 1.2 mol/kg.

In a case of assembling the secondary battery, first, the positive electrode lead 11 including aluminum was welded to the positive electrode current collector 13A, and the negative electrode lead 12 including copper was welded to the negative electrode current collector 14A. Thereafter, the positive electrode 13 and the negative electrode 14 were stacked on each other with the separator 15 (a fine-porous polyethylene film having a thickness of 15 µm) interposed therebetween to thereby obtain a stacked body. Thereafter, the stacked body was wound, following which the protective tape was attached to a surface of the stacked body to thereby obtain a wound body.

Thereafter, the outer package member 20 was folded in such a manner as to sandwich the wound body, following which the outer edges of two sides of the outer package member 20 were thermal fusion bonded to each other. As the outer package member 20, an aluminum laminated film was used in which a surface protective layer (a nylon film having a thickness of 25 µm), a metal layer (an aluminum foil having a thickness of 40 µm), and a fusion-bonding layer (a polypropylene film having a thickness of 30 µm) were stacked in this order. In this case, the sealing film 31 (a polypropylene film having a thickness of m) was interposed between the outer package member 20 and the positive electrode lead 11, and the sealing film 32 (a polypropylene film having a thickness of 5 µm) was interposed between the outer package member 20 and the negative electrode lead 12.

Lastly, the electrolytic solution was injected into the outer package member 20 and thereafter, the outer edges of one of the remaining sides of the outer package member 20 were thermal fusion bonded to each other in a reduced-pressure environment. Thus, the wound body was impregnated with the electrolytic solution, thereby forming the wound electrode body 10 and sealing the wound electrode body 10 in the outer package member 20. As a result, the laminated secondary battery was completed.

Evaluation of battery characteristics of the secondary batteries revealed the results described in Tables 1 to 4. A high-temperature cyclability characteristic was evaluated here as the battery characteristic.

In a case of examining the high-temperature cyclability characteristic, the secondary battery was assembled, following which, first, the secondary battery was charged and discharged for one cycle in an ambient-temperature environment (at a temperature of 25±2° C.) in order to stabilize a state of the secondary battery. Upon charging, the secondary battery was charged with a constant current of 0.2 C until a battery voltage reached the charge voltage Ec described in Tables 1 to 4, following which the secondary battery was charged with a constant voltage of the battery voltage until a current reached 0.05 C. Upon discharging, the secondary battery was discharged with a constant current of 0.2 C until the voltage reached 3.00 V. It should be understood that that 0.05 C is a value of a current that causes the battery capacity (the theoretical capacity) to be completely discharged in 20 hours.

Thereafter, the secondary battery was charged and discharged for another cycle in a high-temperature environment (at a temperature of 45° C.) to thereby measure a second-cycle discharge capacity. Upon charging, the secondary battery was charged with a constant current of 1 C until the battery voltage reached 4.45 V, following which the secondary battery was charged with a constant voltage of the battery voltage of 4.45 V until the current reached 0.05 C. Upon discharging, the secondary battery was discharged with a constant current of 1 C until the voltage reached 3.00 V. It should be understood that that 1 C is a value of a current that causes the battery capacity (the theoretical capacity) to be completely discharged in one hour.

Thereafter, the secondary battery was charged and discharged for another 500 cycles in the same environment to thereby measure a 502nd-cycle discharge capacity. The charging and discharging conditions were similar to the second-cycle charging and discharging conditions except that the current at the time of charging and the current at the time of discharging were each changed to 0.7 C. It should be understood that that 0.7 C is a value of a current that causes the battery capacity (the theoretical capacity) to be completely discharged in 10/7 hours.

Lastly, the following was calculated: high-temperature retention rate (%)=(502nd-cycle discharge capacity/second-cycle discharge capacity)×100.

TABLE 1

| Experiment example | Charge voltage Ec (V) | Area S1 (cm$^2$) | Area S2 (cm$^2$) | Area rate R (%) | Weight M (g) | Rated capacity A (mAh) | Unit capacity C (mAh/g) | Upper limit = −0.28 × R + 178 (mAh/g) | High-temperature retention rate (%) |
|---|---|---|---|---|---|---|---|---|---|
| 1-1 | 4.45 | 716 | 740 | 3.2 | 13.500 | 2248 | 167 | 177 | 73 |
| 1-2 | 4.45 | 716 | 740 | 3.2 | 13.400 | 2245 | 168 | 177 | 84 |
| 1-3 | 4.45 | 716 | 740 | 3.2 | 13.300 | 2273 | 171 | 177 | 83 |
| 1-4 | 4.45 | 716 | 740 | 3.2 | 13.200 | 2305 | 175 | 177 | 82 |
| 1-5 | 4.45 | 716 | 740 | 3.2 | 13.100 | 2317 | 177 | 177 | 81 |
| 1-6 | 4.45 | 716 | 740 | 3.2 | 13.000 | 2320 | 178 | 177 | 75 |
| 1-7 | 4.45 | 315 | 340 | 7.4 | 5.900 | 987 | 167 | 176 | 72 |
| 1-8 | 4.45 | 315 | 340 | 7.4 | 5.880 | 989 | 168 | 176 | 83 |
| 1-9 | 4.45 | 315 | 340 | 7.4 | 5.860 | 992 | 169 | 176 | 83 |
| 1-10 | 4.45 | 315 | 340 | 7.4 | 5.830 | 996 | 171 | 176 | 82 |
| 1-11 | 4.45 | 315 | 340 | 7.4 | 5.800 | 1013 | 175 | 176 | 81 |
| 1-12 | 4.45 | 315 | 340 | 7.4 | 5.770 | 1015 | 176 | 176 | 83 |
| 1-13 | 4.45 | 315 | 340 | 7.4 | 5.750 | 1020 | 177 | 176 | 75 |
| 1-14 | 4.45 | 315 | 340 | 7.4 | 5.700 | 1015 | 178 | 176 | 76 |
| 1-15 | 4.45 | 100 | 113 | 11.5 | 1.900 | 316 | 166 | 175 | 74 |
| 1-16 | 4.45 | 100 | 113 | 11.5 | 1.890 | 318 | 168 | 175 | 83 |

TABLE 2

| Experiment example | Charge voltage Ec (V) | Area S1 (cm²) | Area S2 (cm²) | Area rate R (%) | Weight M (g) | Rated capacity A (mAh) | Unit capacity C (mAh/g) | Upper limit = −0.28 × R + 178 (mAh/g) | High-temperature retention rate (%) |
|---|---|---|---|---|---|---|---|---|---|
| 1-17 | 4.45 | 100 | 113 | 11.5 | 1.870 | 316 | 169 | 175 | 82 |
| 1-18 | 4.45 | 100 | 113 | 11.5 | 1.860 | 318 | 171 | 175 | 81 |
| 1-19 | 4.45 | 100 | 113 | 11.5 | 1.830 | 321 | 175 | 175 | 83 |
| 1-20 | 4.45 | 100 | 113 | 11.5 | 1.830 | 322 | 176 | 175 | 72 |
| 1-21 | 4.45 | 100 | 113 | 11.5 | 1.820 | 323 | 177 | 175 | 71 |
| 1-22 | 4.45 | 100 | 113 | 11.5 | 1.810 | 323 | 178 | 175 | 70 |
| 1-23 | 4.45 | 70 | 82 | 14.6 | 1.300 | 217 | 167 | 174 | 72 |
| 1-24 | 4.45 | 70 | 82 | 14.6 | 1.310 | 220 | 168 | 174 | 84 |
| 1-25 | 4.45 | 70 | 82 | 14.6 | 1.305 | 221 | 169 | 174 | 83 |
| 1-26 | 4.45 | 70 | 82 | 14.6 | 1.300 | 222 | 171 | 174 | 81 |
| 1-27 | 4.45 | 70 | 82 | 14.6 | 1.292 | 223 | 173 | 174 | 82 |
| 1-28 | 4.45 | 70 | 82 | 14.6 | 1.290 | 224 | 174 | 174 | 83 |
| 1-29 | 4.45 | 70 | 82 | 14.6 | 1.285 | 225 | 175 | 174 | 71 |
| 1-30 | 4.45 | 70 | 82 | 14.6 | 1.281 | 226 | 176 | 174 | 72 |
| 1-31 | 4.45 | 70 | 82 | 14.6 | 1.277 | 227 | 178 | 174 | 73 |
| 1-32 | 4.45 | 70 | 82 | 14.6 | 1.273 | 228 | 179 | 174 | 72 |

TABLE 3

| Experiment example | Charge voltage Ec (V) | Area S1 (cm²) | Area S2 (cm²) | Area rate R (%) | Weight M (g) | Rated capacity A (mAh) | Unit capacity C (mAh/g) | Upper limit = −0.28 × R + 178 (mAh/g) | High-temperature retention rate (%) |
|---|---|---|---|---|---|---|---|---|---|
| 1-33 | 4.48 | 716 | 740 | 3.2 | 13.500 | 2261 | 167 | 177 | 73 |
| 1-34 | 4.48 | 716 | 740 | 3.2 | 13.500 | 2268 | 168 | 177 | 84 |
| 1-35 | 4.48 | 716 | 740 | 3.2 | 13.300 | 2339 | 176 | 177 | 83 |
| 1-36 | 4.48 | 716 | 740 | 3.2 | 13.200 | 2341 | 177 | 177 | 82 |
| 1-37 | 4.48 | 716 | 740 | 3.2 | 13.100 | 2338 | 178 | 177 | 75 |
| 1-38 | 4.48 | 70 | 82 | 14.6 | 1.322 | 221 | 167 | 174 | 73 |
| 1-39 | 4.48 | 70 | 82 | 14.6 | 1.318 | 222 | 168 | 174 | 84 |
| 1-40 | 4.48 | 70 | 82 | 14.6 | 1.300 | 226 | 174 | 174 | 84 |
| 1-41 | 4.48 | 70 | 82 | 14.6 | 1.289 | 227 | 176 | 174 | 78 |
| 1-42 | 4.48 | 70 | 82 | 14.6 | 1.288 | 228 | 177 | 174 | 77 |
| 1-43 | 4.48 | 70 | 82 | 14.6 | 1.286 | 229 | 178 | 174 | 73 |

TABLE 4

| Experiment example | Charge voltage Ec (V) | Area S1 (cm²) | Area S2 (cm²) | Area rate R (%) | Weight M (g) | Rated capacity A (mAh) | Unit capacity C (mAh/g) | Upper limit = −0.28 × R + 178 (mAh/g) | High-temperature retention rate (%) |
|---|---|---|---|---|---|---|---|---|---|
| 1-44 | 4.42 | 716 | 740 | 3.2 | 13.200 | 2204 | 167 | 177 | 73 |
| 1-45 | 4.42 | 716 | 740 | 3.2 | 13.100 | 2205 | 168 | 177 | 84 |
| 1-46 | 4.42 | 716 | 740 | 3.2 | 13.200 | 2264 | 172 | 177 | 83 |
| 1-47 | 4.42 | 716 | 740 | 3.2 | 13.200 | 2293 | 174 | 177 | 82 |
| 1-48 | 4.42 | 716 | 740 | 3.2 | 13.200 | 2341 | 177 | 177 | 82 |
| 1-49 | 4.42 | 716 | 740 | 3.2 | 13.300 | 2361 | 178 | 177 | 75 |
| 1-50 | 4.42 | 70 | 82 | 14.6 | 1.317 | 220 | 167 | 174 | 73 |
| 1-51 | 4.42 | 70 | 82 | 14.6 | 1.315 | 221 | 168 | 174 | 84 |
| 1-52 | 4.42 | 70 | 82 | 14.6 | 1.300 | 222 | 171 | 174 | 84 |
| 1-53 | 4.42 | 70 | 82 | 14.6 | 1.293 | 225 | 174 | 174 | 82 |
| 1-54 | 4.42 | 70 | 82 | 14.6 | 1.291 | 226 | 175 | 174 | 76 |

As described in Tables 1 to 4, in the case where the positive electrode 13 included the positive electrode active material (the layered rock-salt lithium-cobalt composite oxide) and the negative electrode 14 included the negative electrode active material (graphite), and where the charge voltage Ec was increased to 4.42 V or higher, the high-temperature retention rate varied depending on the unit capacity C.

Specifically, in a case where the appropriate condition (168≤C≤(−0.28×R+178)) regarding the unit capacity C was satisfied (Experiment examples 1-2 to 1-5, etc.), the high-temperature retention rate increased, as compared with a case where the appropriate condition regarding the unit capacity C was not satisfied (Experiment examples 1-1, 1-6, etc.). More specifically, in the case where the unit capacity C satisfied the appropriate condition, a high high-temperature retention rate of an order of 80% was obtained. In this case, a similar tendency was obtained also in a case where the charge voltage Ec was set to any of the values (i.e., 4.42 V, 4.45 V, or 4.48 V).

Experiment Examples 2-1 to 2-6

As described in Table 5, secondary batteries were fabricated, following which the battery characteristics of the secondary batteries were examined by similar procedures except that the configuration of the negative electrode 14 (the median diameter D50 (m) of the negative electrode active material (artificial graphite)) was changed, and that a low-temperature cyclability characteristic was newly examined.

In a case of examining the low-temperature cyclability characteristic, the state of the secondary battery was stabilized by the above procedures, following which the secondary battery was charged and discharged for one cycle in an ambient-temperature environment (at a temperature of 23° C.) to thereby measure the second-cycle discharge capacity. Thereafter, the secondary battery was charged and discharged for another 100 cycles in a low-temperature environment (at a temperature of 0° C.) to thereby measure a 102nd-cycle discharge capacity. Lastly, the following was calculated: low-temperature retention rate (%)=(102nd-cycle discharge capacity/second-cycle discharge capacity)× 100. Charging and discharging conditions were similar to those for the case of examining the capacity retention characteristic, except that the current at the time of charging was changed to 0.5 C and that the current at the time of discharging was changed to 0.5 C.

TABLE 5

Charge voltage Ec = 4.45 V, Area rate R = 3.2%, Unit capacity C = 175 mAh/g

| Experiment example | D50 (μm) | High-temperature retention rate (%) | Low-temperature retention rate (%) |
|---|---|---|---|
| 2-1 | 2 | 80 | 81 |
| 2-2 | 3.5 | 81 | 83 |
| 2-3 | 5 | 82 | 86 |
| 1-4 | 10 | 82 | 86 |
| 2-4 | 20 | 83 | 87 |
| 2-5 | 30 | 81 | 84 |
| 2-6 | 50 | 80 | 83 |

In a case where the median diameter D50 was within an appropriate range (from 3.5 μm to 30 μm both inclusive) (Experiment examples 1-4 and 2-2 to 2-5), a high high-temperature retention rate was obtained and a high low-temperature retention rate was also obtained, as compared with a case where the median diameter D50 was outside the appropriate range (Experiment examples 2-1 and 2-6). In particular, in a case where the median diameter D50 was within a range of 5 μm to 20 μm both inclusive (Experiment examples 1-4, 2-3, and 2-4), a further higher high-temperature retention rate was obtained and a further higher low-temperature retention rate was also obtained.

Experiment Examples 3-1 to 3-5

As described in Table 6, secondary batteries were fabricated, following which the battery characteristics of the secondary batteries were examined by similar procedures except that the configuration of the negative electrode 14 (the spacing S (nm) of the (002) plane of the negative electrode active material (artificial graphite)) was changed, and that an ambient-temperature cyclability characteristic was newly examined.

TABLE 6

Charge voltage Ec = 4.45 V, Area rate R = 3.2%, Unit capacity C = 175 mAh/g

| Experiment example | Spacing S (nm) | High-temperature retention rate (%) | Ambient-temperature retention rate (%) |
|---|---|---|---|
| 3-1 | 0.3355 | 81 | 84 |
| 3-2 | 0.3356 | 82 | 87 |
| 1-4 | 0.3360 | 82 | 86 |
| 3-3 | 0.3363 | 83 | 87 |
| 3-4 | 0.3370 | 81 | 84 |
| 3-5 | 0.3375 | 80 | 82 |

In a case of examining the ambient-temperature cyclability characteristic, procedures similar to those of the case where the high-temperature cyclability characteristic was determined were performed except that an environment temperature was changed from the high temperature (45° C.) to an ambient temperature (25° C.) to thereby calculate the following: ambient-temperature retention rate (%)=(502nd-cycle discharge capacity/second-cycle discharge capacity)× 100.

In a case where the spacing S was within an appropriate range (from 0.3355 nm to 0.3370 nm both inclusive) (Experiment examples 1-4 and 3-1 to 3-4), a high high-temperature retention rate was obtained and a high ambient-temperature retention rate was also obtained, as compared with a case where the spacing S was outside the appropriate range (Experiment example 3-5). In particular, in a case where the spacing S was within the range of 0.3356 nm to 0.3363 nm both inclusive (Experiment examples 1-4, 3-2, and 3-3), a further higher high-temperature retention rate was obtained and a further higher ambient-temperature retention rate was also obtained.

Based upon the results described in Tables 1 to 6, in the case where the positive electrode 13 included the positive electrode active material (the layered rock-salt lithium-cobalt composite oxide) and the negative electrode 14 included the negative electrode active material (graphite), and where the appropriate condition ($168 \leq C \leq (-0.28 \times R + 178)$) regarding the unit capacity C in the relationship with the area rate R was satisfied: the high-temperature cyclability characteristic was improved. Accordingly, superior battery characteristics of the secondary batteries were obtained.

Although the present technology has been described above with reference to the embodiment and Examples, embodiments of the technology are not limited to those described with reference to the embodiment and Examples above and are modifiable in a variety of ways.

Specifically, although the description has been given of the laminated secondary battery, this is non-limiting. For example, the secondary battery may be of any other type such as a cylindrical type, a prismatic type, or a coin type. Moreover, although the description has been given of a case of the battery device having a wound structure to be used in the secondary battery, this is non-limiting. For example, the battery device may have any other structure such as a stacked structure.

It should be understood that that the effects described herein are mere examples, and effects of the technology are therefore not limited to those described herein. Accordingly, the present technology may achieve any other effect.

It should also be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
a positive electrode that includes a positive electrode active material layer including a lithium-cobalt composite oxide, the lithium-cobalt composite oxide being represented by Formula (1) and having a layered rock-salt crystal structure;
a negative electrode that includes a negative electrode active material layer including graphite; and
an electrolytic solution, wherein,
when the secondary battery is charged and discharged with an upper limit of a closed circuit voltage being set to 4.42 volts or higher, a unit capacity (milli-ampere hour per gram) represented by Formula (2) satisfies, a condition represented by Formula (4) in association with an area rate (percent) represented by Formula (3), the area rate being from 3.2% to 14.6%, $$Li_xCo_{1-y}M_yO_{2-z}X_z \quad (1)$$

wherein
M includes at least one of titanium (Ti), vanadium (V), chromium (Cr), manganese (Mn), iron (Fe), nickel (Ni), copper (Cu), sodium (Na), magnesium (Mg), aluminum (Al), silicon (Si), tin (Sn), potassium (K), calcium (Ca), zinc (Zn), gallium (Ga), strontium (Sr), yttrium (Y), zirconium (Zr), niobium (Nb), molybdenum (Mo), barium (Ba), lanthanum (La), tungsten (W), or boron (B),
X includes at least one of fluorine (F), chlorine (Cl), bromine (Br), iodine (I), or sulfur(S), and
x, y, and z satisfy $0.8<x<1.2$, $0 \leq y<0.15$, and $0 \leq z<0.05$, unit capacity (milli-ampere hour per gram)=rated capacity (milli-ampere hour)/weight (gram) of positive electrode active material layer (2)

wherein the rated capacity is a capacity measured by the secondary battery being charged with a constant current until a closed circuit voltage reaches 4.42 volts or higher, and the secondary battery being charged with a constant voltage of the closed circuit voltage of 4.42 volts or higher, following which the secondary battery being discharged with a constant current, area rate (percent)=[1−(area (square centimeter) of positive electrode active material layer/area (square centimeter) of negative electrode active material layer)]×100 (3)

168 milli-ampere hours per gram≤unit capacity (milli-ampere hour per gram)≤(−0.28×area rate (percent)+178) milli-ampere hour per gram (4).

2. The secondary battery according to claim 1, wherein the graphite includes graphite particles, and
the graphite particles have a median diameter D50 from 3.5 micrometers to 30 micrometers.

3. The secondary battery according to claim 1, wherein spacing of a (002) plane of the graphite is from 0.3355 nanometers to 0.3370 nanometers.

4. The secondary battery according to claim 2, wherein spacing of a (002) plane of the graphite is from 0.3355 nanometers to 0.3370 nanometers.

5. The secondary battery according to claim 1 further comprising a separator, wherein the separator includes a porous film including a synthetic resin or ceramic.

6. The secondary battery according to claim 1, wherein the electrolytic solution includes a solvent and an electrolyte salt.

7. The secondary battery according to claim 6, wherein the solvent includes a cyclic carbonate ester, a chain carbonate ester, a lactone, a chain carboxylate ester, or a nitrile compound.

8. The secondary battery according to claim 1, further comprising a separator, wherein the separator includes a base layer and a polymer compound layer provided on the base layer.

9. The secondary battery according to claim 8, wherein the polymer compound layer includes polyvinylidene difluoride.

10. The secondary battery according to claim 8, wherein the polymer compound layer includes insulating particles.

* * * * *